United States Patent [19]

Dalisa

[11] 4,324,456
[45] Apr. 13, 1982

[54] ELECTROPHORETIC PROJECTION DISPLAY SYSTEMS

[75] Inventor: Andrew L. Dalisa, Cupertino, Calif.

[73] Assignee: U.S. Philips Corporation, New York, N.Y.

[21] Appl. No.: 63,214

[22] Filed: Aug. 2, 1979

[51] Int. Cl.³ .............................................. G02F 1/01
[52] U.S. Cl. ..................................... 350/362; 350/361; 372/24
[58] Field of Search ............... 350/362, 361, 354, 385; 358/56, 60, 63; 204/299 R, 299 PE; 331/94.5 K

[56] References Cited

U.S. PATENT DOCUMENTS

| | | | |
|---|---|---|---|
| 3,668,106 | 6/1972 | Ota | 204/180 R |
| 3,684,683 | 8/1972 | Ota | 204/180 R |
| 3,835,346 | 9/1974 | Mast et al. | 350/361 |

FOREIGN PATENT DOCUMENTS

| | | | |
|---|---|---|---|
| 284858 | 12/1979 | Fed. Rep. of Germany | 331/94.5 K |
| 52-598 | 4/1977 | Japan | 331/94.5 K |

*Primary Examiner*—William L. Sikes
*Assistant Examiner*—Léon Scott, Jr.
*Attorney, Agent, or Firm*—Paul R. Miller

[57] ABSTRACT

Projection display devices and/or remote blackboard systems are provided with electrophoretic type cells used to control the projected light source. Light is directed toward the EPID cell through a total internal reflecting type prism, and reflected light from a totally internal reflecting surface at the interface of the cell and prism is projected to a viewing device. By writing information into the EPID type cell, total internal reflection can be frustrated and an image is formed at the viewing device. Information may be written into the EPID type device by a scanning laser, or by an electrostatic writing instrument.

17 Claims, 3 Drawing Figures

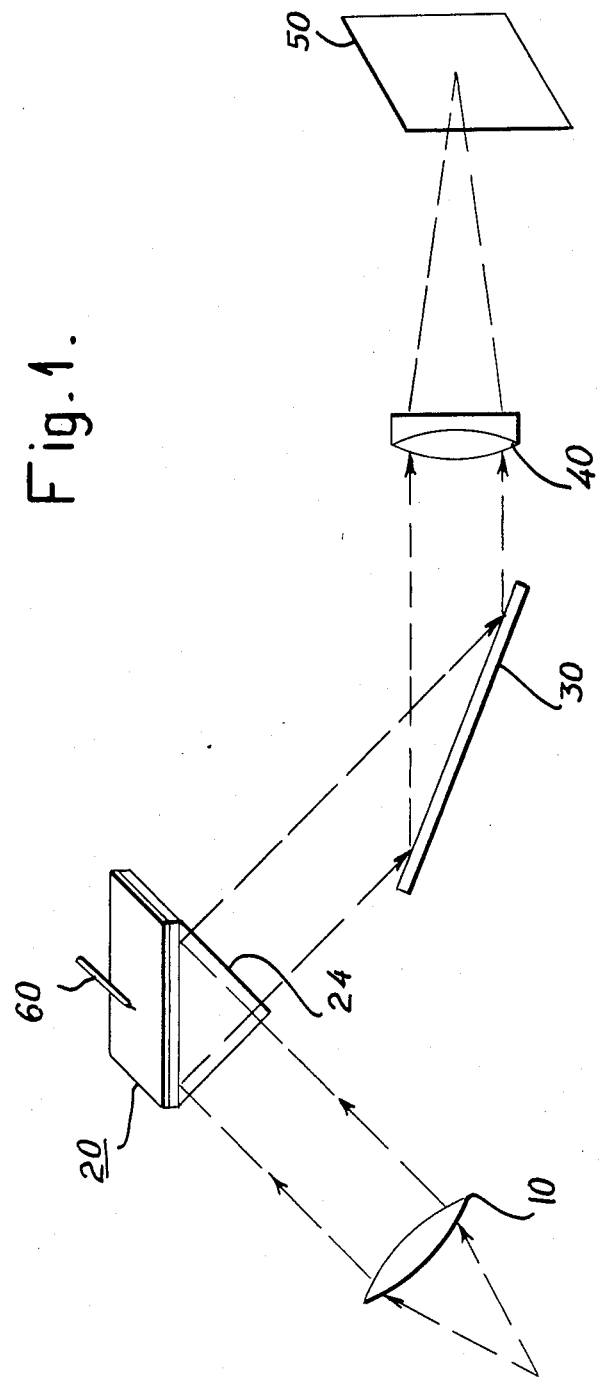

ELECTROPHORETIC PROJECTION DISPLAY SYSTEMS

BACKGROUND OF THE INVENTION

The present invention relates to projection display and recording devices, and in particular, to such projection display devices in which the projected images or patterns to be displayed are controlled by an electrophoretic type cell.

The use of electrophoresis in display devices containing a colloidal layer of suspended particles between electrodes has been previously contemplated, such as described in U.S. Pat. Nos. 3,612,758 and 3,668,106. These patents are hereby incorporated by reference to provide basic information of the chemistry and technology of electrophoretic displays.

A simple electrophoretic image display (EPID) device is a passive, light scattering-type display. This EPID device is constructed as a cell which consists of a colloidal suspension of pigment particles in an organic liquid held between two electrodes, at least one of which is transparent. In one operative mode, the pigment particles are negatively charged with respect to the liquid. If a positive potential is applied to an electrode in electrical contact with the suspension, the negatively charged pigment particles will be attracted to that electrode. A negative potential on an electrode repels the particles, to the opposite side of the cell.

One panel of the device is made of a transparent material such as glass, coated with a transparent, electrically-conducting layer forming one electrode. When light-colored pigment is attracted to this panel electrode, an observer looking at the panel sees the reflected color of the pigment. A dark-colored dye is included in the suspending medium so that pigment at the back of the cell is obscured by the opaque dye and the observer sees only the reflected color of the dye. When the polarity of the voltage on the electrodes is reversed, the position of the color is reversed. This EPID display cell also possesses "memory" since the particles remain on the electrodes after the applied voltages are removed due to chemical, electrical, or van der Waals forces.

Further, U.S. Pat. application Ser. No. 854,117 filed on Nov. 23, 1977, by Dalisa (the inventor of the present application) and Singer, and assigned to the Assignee of the present application, now U.S. Pat. No. 4,203,106, discloses EPID displays which are addressable and/or include electrode structures for establishing selective electric fields to transport suspended colloidal particles in the cell, and causing images to be formed by the presence or absence of particles at one of the electrode surfaces of the cell. This prior application is also hereby incorporated herein by reference.

Moreover, light transmissive electrophoretic image displays have been contemplated in which internally reflecting members are utilized to provide background illumination, as described in U.S. pat. application Ser. No. 63,634, filed on Aug. 2, 1979, now U.S. Pat. No. 4,218,302, by Dalisa (the inventor of the present application) and Seymour and assigned to the Assignee of the present application. This patent to Dalisa and Seymour is hereby incorporated herein by reference.

While such devices are highly desirable and provide a significant advance in the art, they are largely limited to direct viewing type devices. It is desirable in many instances to provide projection of the image formed by the EPID device to a remote viewing apparatus, and to operate in a reflection mode.

SUMMARY OF THE INVENTION

The present invention achieves these desirable aspects, and provides the benefits of projected type image displays that can operate with an inherent memory. Moreover, the apparatus of the present invention allows information to be written into and/or erased from the display device, while being viewed in a projection mode. A remote type blackboard is thus possible.

These benefits and advantages of the present invention are made possible by using an electrophoretic type cell to control total internal reflection of light from a source being projected to a viewing device. This is achieved by utilizing a total internal reflection (TIR) prism interfacing with an electrophoretic type cell, and with the light being totally reflected at the prism-liquid interface. When information is written into the electrophoretic type cell suspended electrophoretic particles can be caused to deposit in an image-wise fashion at the prism-liquid interface, and then total internal reflection is frustrated. This region will appear as a dark image on the viewing apparatus since little light is reflected to the viewing device. Information can be written into the electrophoretic type cell by way of a scanning laser which can disrupt the van der Waals type bonds between the particles and a surface of the cell, thereby allowing the freed particles to move to the prism-liquid interface. After the cell is scanned by the laser, the information formed in the cell can be erased by application of an appropriate voltage pulse.

Alternatively, information can be locally written into the cell with an electrostatic writing instrument, such as an electrostatic pencil or pen, to create a remote blackboard application. Thus, upon writing on the cell surface by hand with the electrostatic pencil, the electrophoretic particles are repelled to the prism-liquid interface (or alternatively can be attracted away from the prism-liquid interface) so as to form an information image which is projected to the viewing apparatus because of the corresponding change in total internal reflection at the prism-liquid interface.

BRIEF DESCRIPTION OF THE DRAWINGS

FIG. 1 is a partial schematic view depicting the electrophoretic projection display device according to the present invention;

DETAILED DESCRIPTION OF THE DRAWINGS

Figure 1A:
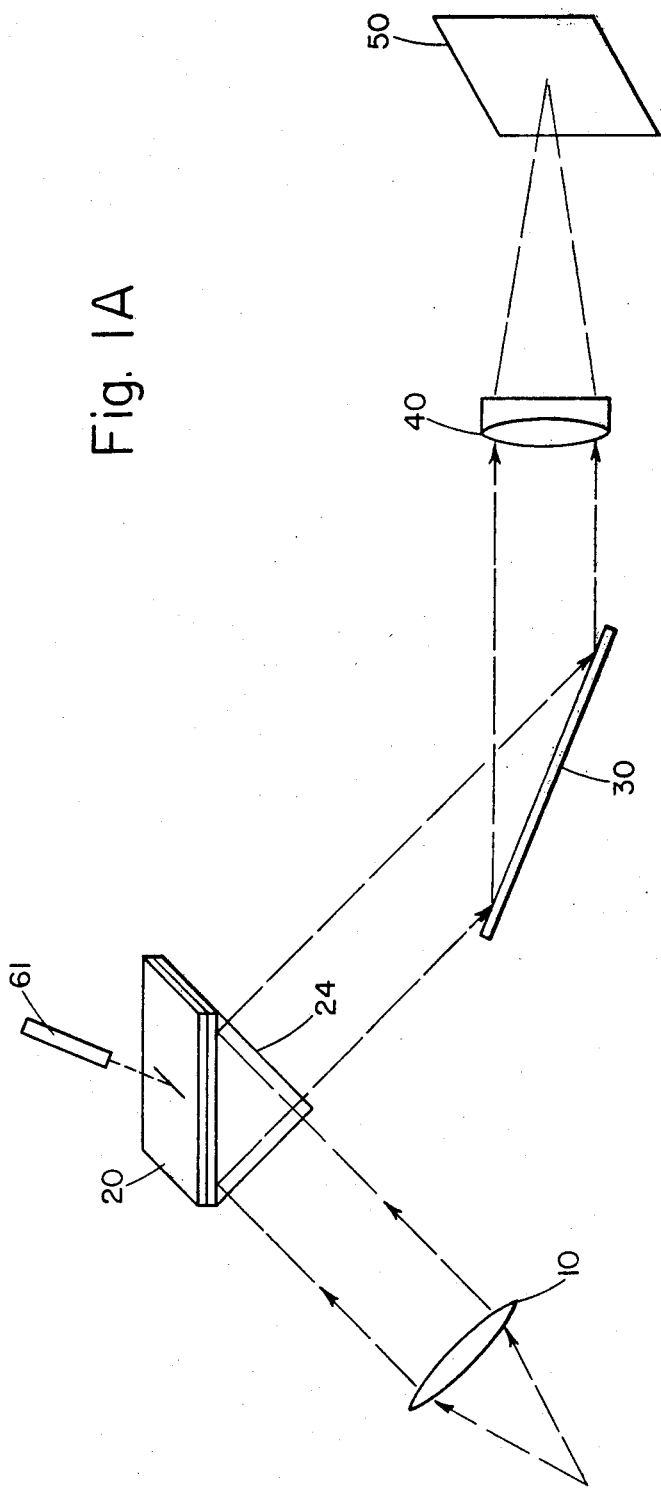
FIG. 1A is a partial schematic view similar to FIG. 1 but using a scanning laser.

The electrophoretic projection display device according to the present invention may be constructed as illustrated in FIG. 1. A light source is collimated by collimating lens 10 to a totally internally reflecting (TIR) prism 24 having the total reflecting surface 22 interfacing with an EPID type cell 20. The light reflected from the reflecting surface of the TIR prism 24 is thereafter directed by way of mirror 30 through a projecting lens 40 onto a viewing screen 50.

Figure 2:
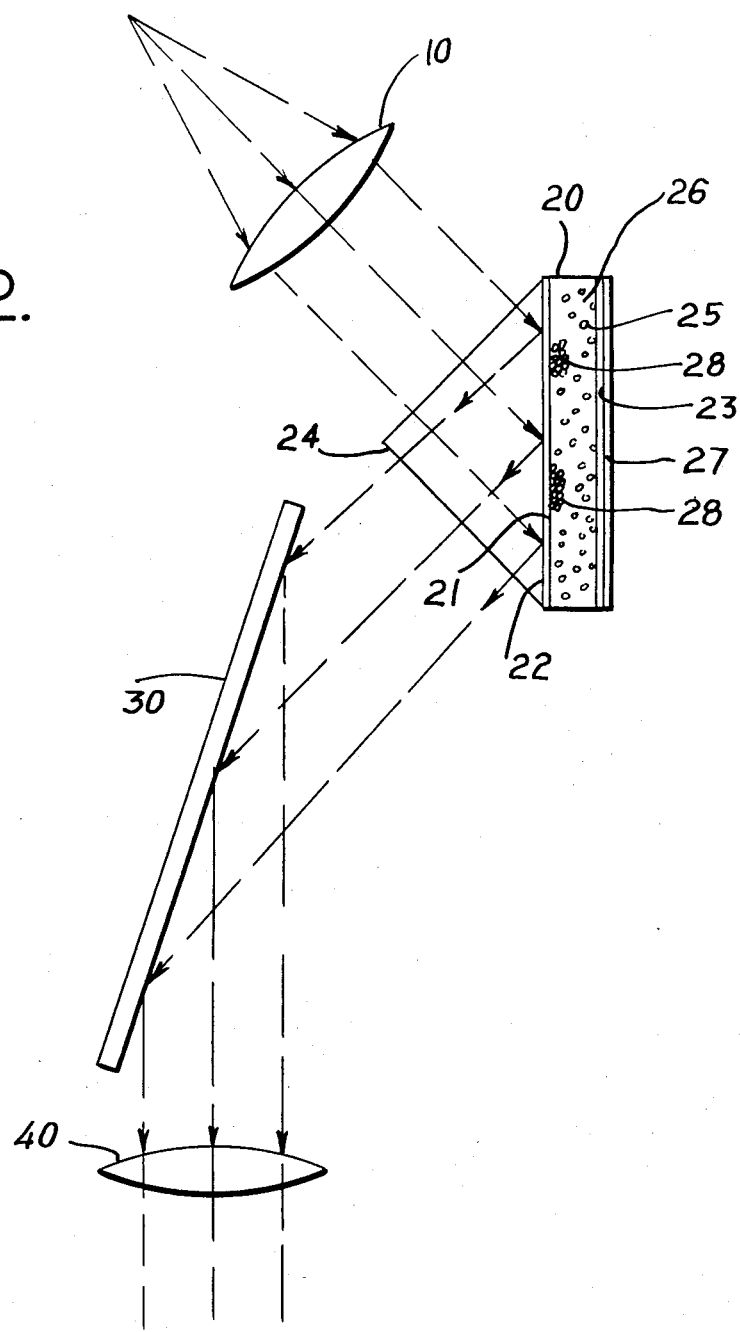
FIG. 2 is a sectional side elevational view schematically showing the electrophoretic type cell in the projection apparatus of the present invention.

By reference to FIG. 2, control of total internal reflected light in the prism 24 by the EPID type cell 20 may be understood. Namely, the EPID type cell 20 comprises a construction having a thin light transmissive electrode 21 disposed at the total internal reflecting surface 22 of the prism 24. A further electrode structure 23 is spaced from the first electrode 21, and a colloidal suspension of electrophoretic particles 25 is provided in an insulating liquid 26 in the space between the electrode structures 21 and 23. A light transmissive plate 27 is disposed adjacent to the electrode structure 23.

Application of appropriate voltages between the electrode structures 21 and 23 can cause transport of the electrophoretic particles 25 in the insulating liquid 26 onto the surface of either of the electrode structures. Where the electrode structures are formed in an addressable manner, then the transport of the electrophoretic particles may be in image-wise fashion at selected regions or areas of the electrode surface. Under the condition that the index of refraction of the insulating liquid 26 is less than the index of refraction of the prism 24 and/or the electrode coating 21, and the index of refraction of the electrophoretic particles 25 is greater than the index of refraction of the prism 24, then the deposition 28 of the electrophoretic particles at the prism-liquid interface or surface 22 frustrates total internal reflection of the prism 24 at those regions. Consequently, light will be scattered into the EPID cell at the regions 28 and will appear as dark areas on the viewing screen 50 since very little reflected light is projected to the screen 50 from these regions.

Accordingly, by applying appropriate voltages on the electrode structures 21 and 23 of the EPID type cell, images can be formed which are projected to the viewing screen 50. Because the particles 28 may be maintained at the surface 22 by way of electrical, chemical, and/or van der Waals forces even after the voltage applied to the electrodes is removed, then the display device exhibits an inherent memory. Removal of the electrophoretic particles from the aggregated regions can be by way of the application of an appropriate counter force.

A scanning laser 61, as shown in FIG. 1A, may be utilized to write information into the EPID type cell. As an operative possibility, all of the electrophoretic particles are first brought to the non-TIR surface electrode structure 23 by applying a voltage of appropriate polarity. A small reverse voltage is then applied such that the particles remain attached to the surface, but when the scanning laser beam breaks the van der Waal's type bond between the particles and the surface, the freed particles will move to the TIR electrode surface 22, i.e. the prism-liquid interface. After all lines are scanned, the cell can be erased by the application of the same initial voltage pulse.

In a further operative mode, all of the electrophoretic particles may be attracted to one surface, as above where the voltage is then removed, and an information writing instrument 60 (FIG. 1), such as an electrostatic pencil writes information by hand onto the cell surface 27. In this regard, if all of the particles have been previously attracted to the electrode structure 23, then electrostatic pencil repels particles to the opposite surface, or the TIR interface. On the other hand, all of the particles may be initially attracted to the electrode 21 (with the subsequent removal of the voltage, as above), and then the writing of the information with the electrostatic pencil 60 would attract the particles away from the TIR surface. Reversal of the charge on the electrostatic pencil would permit local erasure.

The writing of information by hand with the electrostatic pencil provides local changes in the position of the electrophoretic particles. As such, an image of the information written onto the EPID type cell surface 25 would be projected to the viewing apparatus 50. A remote blackboard arrangement, thus results inasmuch as an operator can write information onto the surface of the EPID cell, which information is then projected to a remote position for viewing by others.

The electrode structures 21 and 23 can be formed as disclosed in the above-mentioned patents and patent applications. In particular, the electrodes may be formed of thin films or layers of transparent conductive material, such as tin oxide or indium oxide. These may be formed on the reflecting surface 22 of prism 24 and the facing surface of plate 27 by means of sputtering. On the other hand, the electrode structure 23 may be formed of row and column electrodes in the manner of the above-mentioned Dalisa et al patents, while the electrode structure 21 may be a continuous electrode on surface 22.

The "electrophoretic fluid" of electrophoretic particles 25 and insulating fluid 26 may be comprised of a dielectric fluid (such as a mixture of xylene and perchlorethylene) and transparent or colored particles homogeneously dispersed therein. These particles can be transparent or can be colored, so long as they affect the reflection of light at the fluid prism interface. This suspension is more generally referred to throughout the specification and claims as an "electrophoretic fluid". All particles in the suspension have a charge of a single polarity which may be achieved by the addition of charging agents to the liquid with some examples of suitable agents being an amine attached to a polymeric hydrocarbon chain.

The respective indices of refraction of the insulating fluid 26, the colloidal particles 25, and the prism 24 and the angles of incidence of the light rays are determined to satisfy the following equation:

$$\theta_c = \sin^{-1}(n_1/n_2)$$

where:
$\theta_c$ is the critical angle,
$n_1$ is the index of refraction of the fluid or of the particles, depending on which is present at a particular area of the interface between the fluid-particle colloidal suspension and prism, and
$n_2$ is the index of refraction of the prism and electrode at the interface with the colloidal suspension.

The angle of incidence $\theta_i$, which is defined as the angle between incident light and a normal to the surface 22, should exceed the critical angle $\theta_c$ for the fluid but not $\theta_c$ for the particles, in order for total internal reflection to be frustrated at regions 28 and light coupling to occur from the prism into the colloidal suspension at these regions. The angle of reflection may be designated as $\theta_R$.

Various elements having respective indices of refraction can be used in the present invention, so long as the above relationship is satisfied. The prism 24 can have a refractive index of about 1.7, while the colloidal particles 25 can have a refractive index of about 2.0 and the insulating fluid 26 can have a refractive index of about 1.5. It is important that the insulating fluid 26 of the cell always have a refractive index less than that of the prism 24 and electrode 21 and that refractive index for the colloidal particles be such to achieve light coupling by the particles and to frustrate the internal reflection at the regions or areas where the information is written.

What I claim is:

1. An electrophoretic projection display system comprising a light source, means for collimating light from said light source, total internal reflecting means receiving collimated light from said collimating means for totally reflecting said light, electrophoretic means associated with said total internal reflecting means for controlling total reflection of said light, means for projecting the reflected light, and viewing means for viewing the projected light.

2. A projection display system according to claim 1, wherein said electrophoretic means includes an electrophoretic type cell, and said total internal reflecting means comprises a total internal reflecting prism with a total reflecting surface forming one surface of said electrophoretic type cell.

3. A projection display system according to claim 2, wherein said electrophoretic means controls said total reflection by information introduced into said electrophoretic means.

4. A projection display system according to claim 3, further comprising means for writing said information into said electrophoretic means.

5. A projection display system according to claim 4, wherein said writing means includes a scanning laser.

6. A projection display system according to claim 4, wherein said writing means includes an electrostatic writing instrument.

7. A projection display system according to claim 1, wherein said electrophoretic means controls said total reflection by information introduced into said electrophoretic means.

8. A projection display system according to claim 7, further comprising means for writing said information into said electrophoretic means.

9. A projection display system according to claim 8, wherein said writing means includes a scanning laser.

10. A projection display system according to claim 8, wherein said writing means includes an electrostatic writing instrument.

11. A projection display system according to claim 1, further comprising means for writing information into said electrophoretic means.

12. A projection display system according to claim 11, wherein said writing means includes a scanning laser.

13. A projection display system according to claim 11, wherein said writing means includes an electrostatic writing instrument.

14. An electrophoretic projection display system comprising
 first means for projecting light
 second means receiving said light for totally internally reflecting said light, said second means including a prism having one surface for totally internally reflecting said light and an electrophoretic cell contacting said one surface,
 third means for writing information into said electrophoretic cell, and for changing the index of refraction of electrophoretic liquid in said electrophoretic cell at said one surface in accordance with information written into said electrophoretic cell so that light is not totally internally reflected at said one surface, and
 fourth means for projecting reflected light from said one surface to a viewing screen.

15. An electrophoretic display system according to claim 14, wherein said prism has an index of refraction higher than the index of refraction of said electrophoretic liquid in said cell, while electrophoretic particles in said cell have an index of refraction greater than said index of refraction of said prism.

16. An electrophoretic display system according to claim 14, wherein said third means for writing information includes a scanning laser.

17. An electrophoretic display system according to claim 14, wherein said third means for writing information includes an electrostatic writer.

* * * * *